(12) United States Patent
Kosuge et al.

(10) Patent No.: US 6,502,206 B1
(45) Date of Patent: Dec. 31, 2002

(54) MULTI-PROCESSOR SWITCH AND MAIN PROCESSOR SWITCHING METHOD

(75) Inventors: Yukio Kosuge, Yokohama (JP); Kazumasa Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/326,621

(22) Filed: Jun. 7, 1999

(30) Foreign Application Priority Data

Dec. 15, 1998 (JP) .......................................... 10-356342

(51) Int. Cl.[7] .................................................. G06F 11/16
(52) U.S. Cl. ........................................................ 714/13
(58) Field of Search .............................. 714/13, 11, 10, 714/12; 709/105

(56) References Cited

U.S. PATENT DOCUMENTS

| | | | | |
|---|---|---|---|---|
| 5,222,217 A | * | 6/1993 | Blount et al. ............... | 395/325 |
| 5,491,787 A | * | 2/1996 | Hashemi ...................... | 714/11 |
| 5,696,895 A | * | 12/1997 | Hemphill et al. ............ | 714/4 |
| 5,704,032 A | * | 12/1997 | Badovinatz et al. .......... | 714/4 |
| 5,764,882 A | * | 6/1998 | Shingo ......................... | 714/11 |
| 5,781,433 A | * | 7/1998 | Nabeya et al. ............... | 364/184 |
| 5,796,936 A | * | 8/1998 | Watabe et al. ................ | 714/11 |
| 6,148,415 A | * | 11/2000 | Kobayashi et al. ........... | 714/15 |
| 6,292,905 B1 | * | 9/2001 | Wallach et al. ............... | 714/4 |

FOREIGN PATENT DOCUMENTS

JP 7-249014 9/1995

\* cited by examiner

*Primary Examiner*—Scott Badesman
(74) *Attorney, Agent, or Firm*—Staas & Halsey L.L.P.

(57) ABSTRACT

A multi-processor switch includes a main processor, a plurality of co-processors to perform a calling process under the control of the main processor, a detection unit to detect a failure at the main processor, and a determination unit to determine which replacement processor will perform the main processor functions from among the co-processors, based on the operating state of each co-processor when the failure at the main processor is detected by the detection unit. The operating state of each of the co-processor is, for example, the load state imposed on the co-processor or the number of times its operation has been resumed. By selecting a co-processor that has a small load or which has been resumed less frequently, an appropriate, more stable replacement processor can be determined.

10 Claims, 10 Drawing Sheets

PRIOR ART

MULTI-PROCESSOR SWITCH AND MAIN PROCESSOR SWITCHING METHOD

BACKGROUND OF THE INVENTION

1. Field of the Invention

The present invention relates to a multi-processor switch having one main processor and a plurality of co-processors, and in particular to a method for, when a failure occurs at the main processor, switching the processor performing the main processor functions from the main processor to one of the co-processors.

2. Related Arts

FIG. 14 is a schematic block diagram illustrating a conventional multi-processor switch. Of the plurality of processors included in the multi-processor switch (hereinafter referred to simply as a switch), one processor, the main processor (hereinafter referred to simply as the MPR), determines overall operations performed by the switch and controls co-processors which will be described next, but does not itself perform calling processes. Instead, calling processes are performed by co-processors (hereinafter referred to simply as CPRs) based on the control by MPR. A plurality of CPR (CPR#0, #1, #2, . . . ) are generally provided in order to distribute the load imposed by the need to perform calling processes for many subscriber terminals connected to the switch, or for another switch. A storage device (a hard disk unit (HDU)) is provided for each of MPR and the CPRs.

In FIG. 14, an SP device 101 is a line device for terminating a line connected to a terminal (e.g., a telephone) which transmits an audio signal. A signal device 102 is a line device for terminating a line connected to a terminal (e.g., a facsimile machine) that transmits data which is not accompanied by an audio signal. And a relay device 103 is a line device for terminating a line connected to another switch. These line devices are connected to the MPR and the CPRs via a bus 100.

It is assumed that during the operation of a switch, the MPR will at some time and for some reason malfunction. And since at such a time overall control of all switch operations, including the control provided for the CPRs by the MPR, is lost, all calling operations being processed by the switch would be halted, even though the CPRs performing those operations would still be capable of functioning normally. The result in this case would be the occurrence of a so-called system shutdown, to recover from which an operator must conventionally perform a manual operation using a maintenance terminal 110, as shown in FIG. 14.

In order to avoid a system shutdown, according to one conventional method the MPR functions are assigned to a CPR which is selected in advance, so that should a failure occur at the MPR, the selected CPR will begin to perform the MPR functions.

However, if a CPR is selected in advance to perform the MPR functions when a malfunction occurs at the MPR, the following problem may be encountered.

Avoidance of a system shutdown will not be possible if the selected CPR is also broken down. And if the selected CPR is unstable and tends to be broken down due to a specific reason, a system failure involving the selected CPR can occur when responsibility for the performance of the MPR functions is shifted to it. In addition, when the load imposed on the selected CPR is greater than the loads imposed on the other CPRs, overloading of the selected CPR will occur when it has to perform the MPR functions. This condition will result in the deterioration of the capabilities of the selected CPR and in the instability of the overall operation of the switch.

SUMMARY OF THE INVENTION

It is, therefore, one objective of the present invention to provide a multi-processor switch which, when a failure occurs at a main processor, selects an appropriate co-processor and permits it to function as the main processor, and a main processor switching method therefor.

To achieve the above objective, according to the present invention, it is provided a multi-processor switch comprising:

a main processor;

a plurality of co-processors for performing a calling process under the control of the main processor;

a detection unit for detecting a failure at the main processor; and a determination unit for determining a replacement processor for performing the main processor functions from among the co-processors based on the operating state of each co-processor when the failure at the main processor is detected by the detection unit.

Also, to achieve the above objective, according to the present invention it is provided a main processor switching method for a multi-processor switch including a main processor and a plurality of co-processors for performing calling processes under the control of the main processor, comprising the steps of:

detecting a failure at a main processor;

determining a replacement processor for performing the main processor functions from among the co-processors based on the operating state of the co-processors; and performing the main processor functions by the replacement processor.

The operating state of each of the co-processors is, for example, the load state imposed on the co-processor or the number of times its operation has been resumed, or a combination of the two. By selecting a co-processor as the replacement processor which has a small load or which has been resumed less frequently, an appropriate, more stable replacement processor can be determined.

DETAILED DESCRIPTION OF THE PREFERRED EMBODIMENTS

The preferred embodiments of the present invention will now be described. It should be noted, however, that the technical scope of the present invention is not limited to these embodiments.

Figure 1:
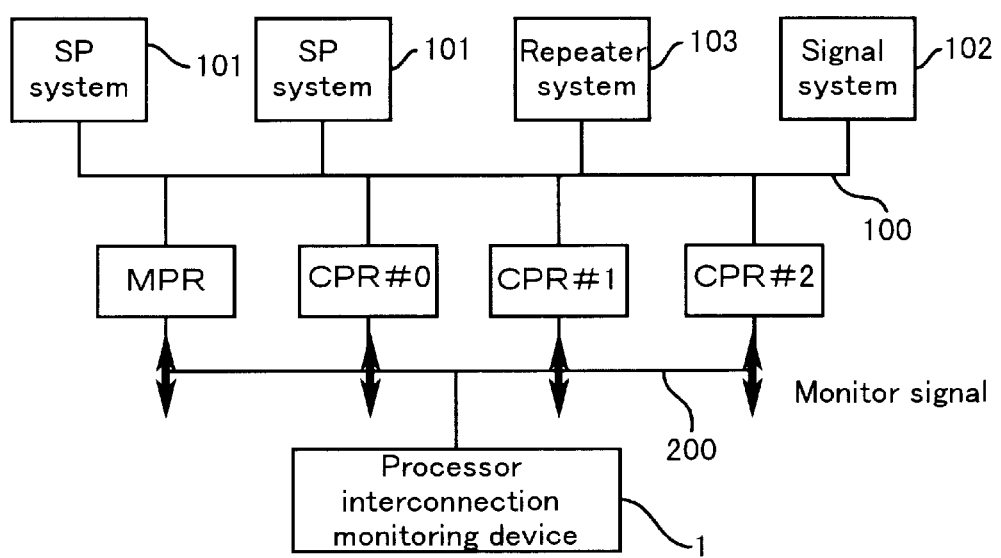
FIG. 1 is a block diagram illustrating a multi-processor switch according to a first embodiment of the present invention.
Figure 14:
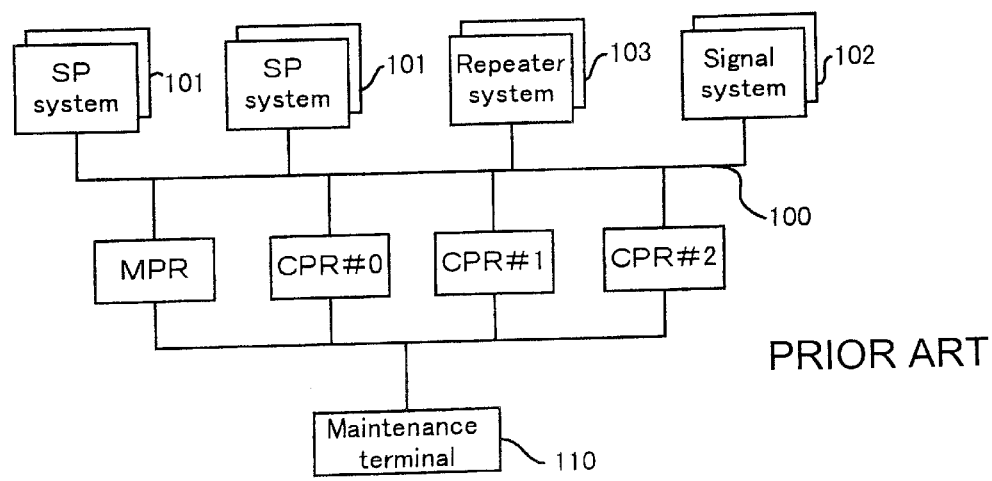
FIG. 14 is a schematic block diagram illustrating a conventional multi-processor switch.

FIG. 1 is a block diagram illustrating a multi-processor switch according to a first embodiment of the present invention. The same reference numerals as used in FIG. 14 are also used to denote corresponding or identical components. In FIG. 1, a processor interconnection monitoring device 1 is connected to bus 200 which connects each processors MPR, CPRs. For example, the processor interconnection monitoring device 1 is constituted by a firmware. The processor interconnection monitoring device 1 transmits a monitor signal to each processors MPR, CPRs periodically. Each processors transmits a monitor response signal for responding to the monitor signal to the processor interconnection monitoring device 1.

Figure 2:
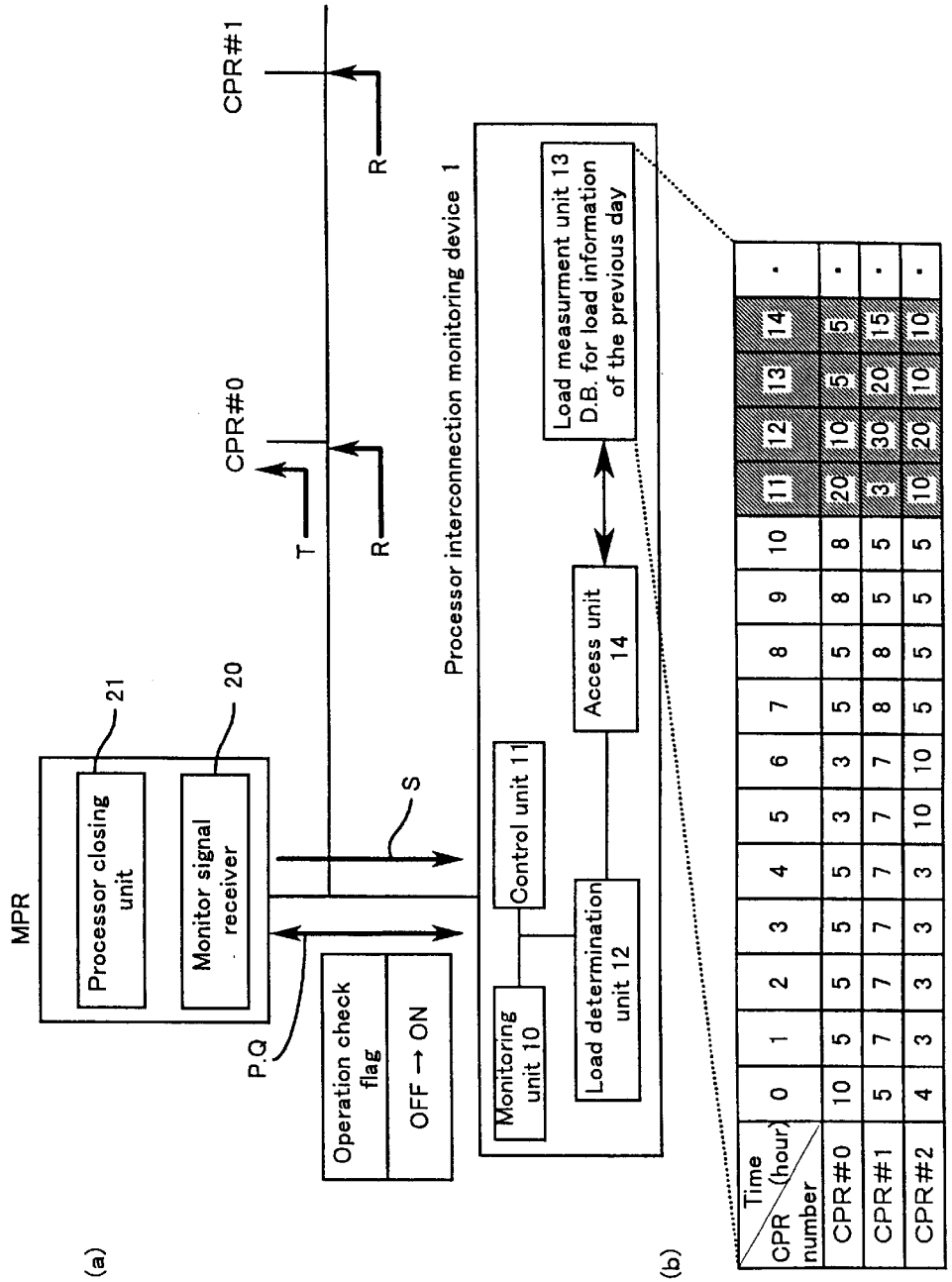
FIG. 2 is a diagram for explaining a processor interconnection monitoring device and an MPR according to the first embodiment of the present invention.

FIG. 2 is a diagram for explaining a processor interconnection monitoring device 1 and an MPR according to a first embodiment of the present invention. In FIG. 2A, a monitoring unit 10 in the processor interconnection monitoring device 1 transmits a monitor signal P including an operation check flag to the MPR. The monitor signal P is received at the MPR by a monitor signal receiver 20 which, upon receiving the signal, turns on the operation check flag included in the monitor signal P and returns a monitor response signal Q including the operation check flag, which is then in the ON state, to the processor interconnection monitoring device 1.

The monitoring unit 10 of the processor interconnection monitoring device 1 analyzes the received monitor response signal Q. When the operation check flag included in the monitor response signal Q is ON state, the monitoring unit 10 determines that the MPR is normal state. When the operation check flag is OFF state, the monitoring unit 10 determines that the MPR is abnormal state. And when the monitor response signal Q is not received, the processor interconnection monitoring device 1 also determines that the MPR is abnormal state.

When the monitoring unit 10 detects an abnormal state of the MPR, it transmits an MPR failure notification signal R to each CPRs. Upon receiving this signal R, the CPRs stop communication with the MPR.

Thereafter, the processor interconnection monitoring device 1 collects information concerning the loads carried by each CPR, and determines a load state of each CPR. For this determination, as is shown in FIG. 2A the processor interconnection monitoring device 1 comprises a control unit 11, a load determination unit 12, a load measurement unit 13, and an access unit 14. Specifically, the load determination unit 12 accesses the load measurement unit 13 via the access unit 14 and collects information concerning the load state of each CPR for each hour of the previous day.

The load measurement unit 13 calculates the ratio (load state) of the hourly utilization of each CPR (CPR#0, CPR#1 or CPR#2) to the operating hours of the switch, and stores the results, as shown in FIG. 2B, as a load state table in the database of the load measurement unit 13. In FIG. 2B, the table contains load state information for each hour of the previous day, which information is employed for the following reason. Since the normal load imposed by the calling process performed by a CPR fluctuates in consonance with a one day cycle, following the failure of an MPR, to obtain the most reliable load state information for use when determining for which CPR the load may be increased, information concerning the load imposed during the same hour and the following hours the previous day is referred to.

The load determination unit 12 employs the table in FIG. 2B in the following manner to determine the load state of each CPR. When the failure of the MPR occurs at eleven in the morning, the load determination unit 12 collects, from the load state information table in FIG. 2B, the load state information for the four hour period beginning at eleven o'clock in the morning of the previous day, and from this determines the CPR which had the smallest total load value during that period. For example, the loads for CPR#m, CPR#1 and CPR#2 are $CPR\#0=20+10+5+5=40$ $CPR\#1=3+30+20+15=68$ $CPR\#2=10+20+10+10=50.$ That is, the load for CPR#0 was the smallest, and therefore, the control unit 11 selects CPR#0 as the processor for performing the MPR function (the replacement processor).

When a failure occurs at the MPR, the MPR automatically performs a resumption initial setup process. When the recovery of the MPR is not resumed by the resumption initial setup process, the MPR repeats the resumption initial setup process and does not close down. For this process, the MPR in this embodiment includes a processor closing unit 21. The processor closing unit 21 counts the number of times the resumption initial setup process is performed by the MPR. When the MPR is not resumed by the time the performance count has reached a predetermined value, the processor closing unit 21 terminates the performance of the resumption initial setup process, and closes down the processor. Thereafter, the processor closing unit 21 transmits a closing signal S to the processor interconnection monitoring device 1, which, upon receiving the closing signal S, transmits an MPR closing notification signal T to CPR#0, which is to function as the MPR. Upon receiving the signal T, CPR#0 identifies itself as the replacement processor, and begins the performance of the MPR functions, which will be described later in detail.

Figure 3:
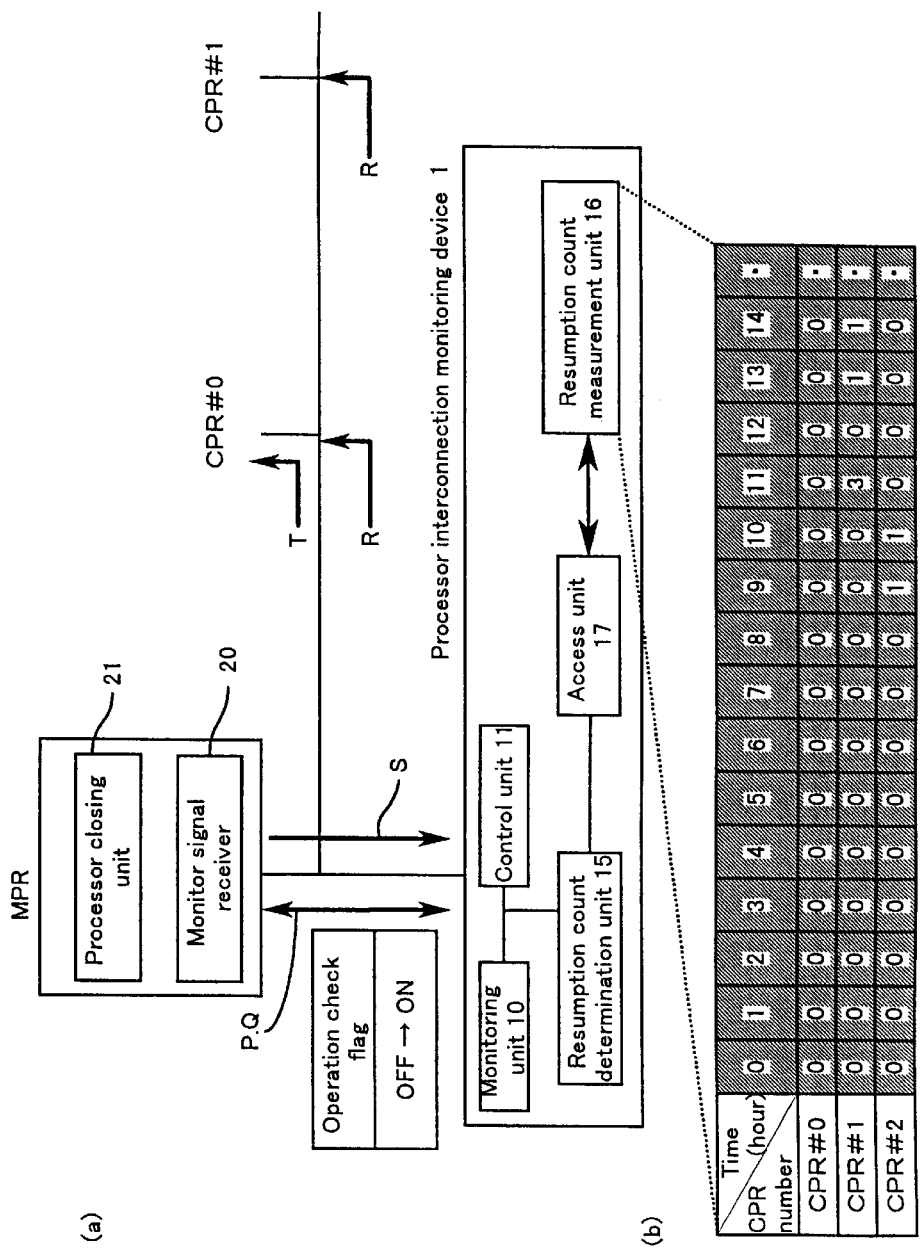
FIG. 3 is a diagram for explaining a processor interconnection monitoring device and an MPR according to a second embodiment of the present invention.

FIG. 3 is a diagram for explaining a processor interconnection monitoring device 1 and an MPR according to a second embodiment of the present invention. In FIG. 3A, since a monitor signal P, a monitor response signal Q, and an MPR failure notification signal R are the same as those in the first embodiment, no explanation for them will be given.

When a monitoring unit 10 in the processor interconnection monitoring device 1 detects a failure at the MPR, it collects CPR resumption count information to determine the number of times the CPR has been resumed. For this process, as is shown in FIG. 3A, the processor interconnection monitoring device 1 comprises a control unit 11, a resumption count determination unit 15, a resumption count measurement unit 16, and an access unit 17. Specifically, the resumption count determination unit 15 accesses the resumption count measurement unit 16 via the access unit 17, and collects the count of the resumption initial setup processes performed by each CPR the previous day (resumption count).

The resumption count measurement unit 16 obtains the resumption count for each CPR (CPR#0, CPR#1 or CPR#2) for every hour, and stores the result in the database of the resumption count measurement device 16 as a resumption count table, as is shown in FIG. 3B. The table in FIG. 3B shows resumption count information for every hour of the previous day. The resumption count information for the previous day is employed because this is the latest information available concerning the operating state of the CPR, and is thus regarded as being the most reliable.

The resumption count determination unit 15 employs the table in FIG. 3B to determine the resumption count for each CPR in the following manner. The total resumption count for the 24 hours of the previous day is obtained for each CPR, and the CPR for which the resumption count is the smallest is determined. Specifically, since the resumption counts for CPR#0, CPR#1 and CPR#2 are 0, 5 and 2, the resumption count determination unit 15 determines that CPR#0, for which the resumption count is the smallest, is the most stable CPR. Thus, the control unit 11 selects CPR#0 as the processor for performing the MPR functions(the replacement processor).

In the above described manner, the processor interconnection monitoring device 1 transmits an MPR closing notification signal T to CPR#0, and upon receiving this signal, CPR#0 identifies itself as the replacement processor.

Figure 4:
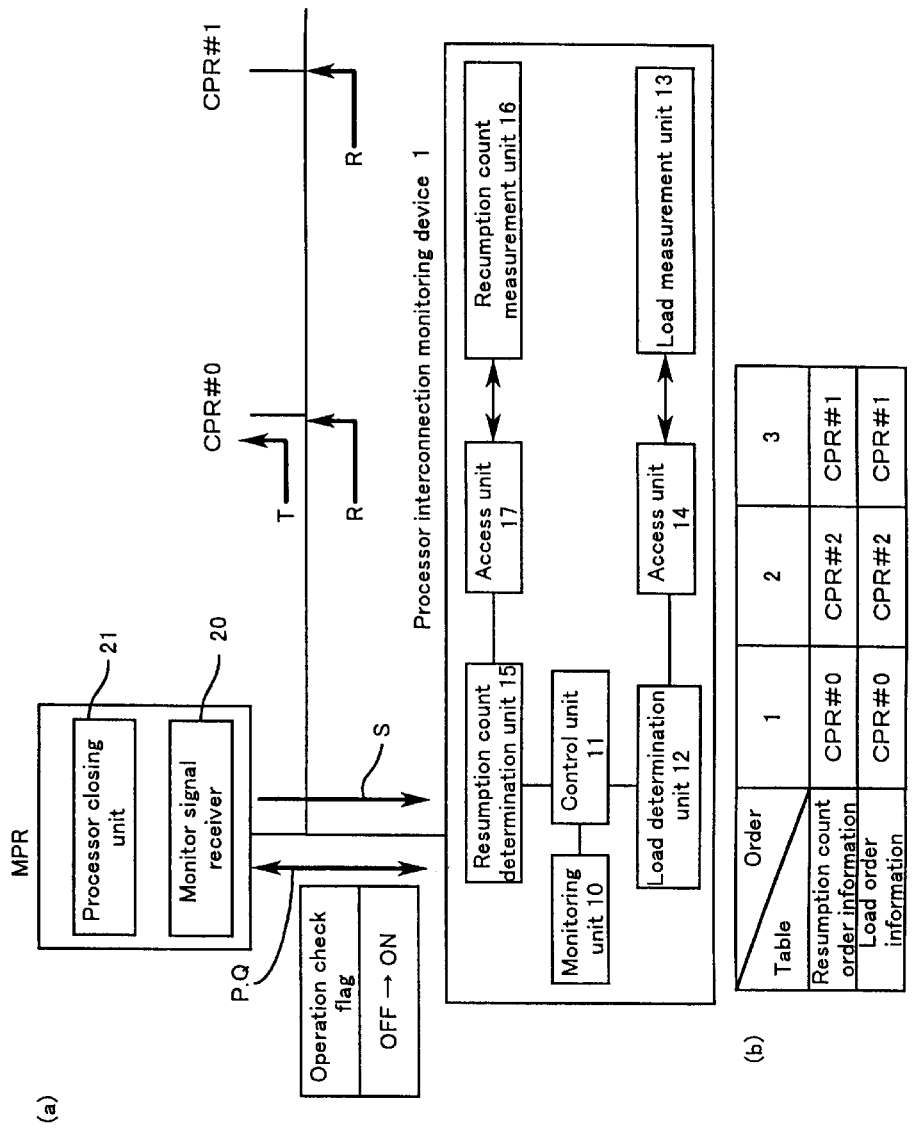
FIG. 4 is a diagram for explaining a processor interconnection monitoring device and an MPR according to a third embodiment of the present invention.

FIG. 4 is a diagram for explaining a processor interconnection monitoring device 1 and an MPR according to a third embodiment of the present invention. The third embodiment is a combination of the first and the second embodiments. That is, a CPR for performing the MPR function (the replacement processor) is selected based on the load state information and the resumption count information for the CPRs. In FIG. 4A, since a monitor signal P, a monitor response signal Q and an MPR failure notification signal R are the same as those in the first embodiment, no explanation for them will be given.

When a monitoring unit 10 in the processor interconnection monitoring device 1 detects a failure at an MPR, a load determination unit 12 collects load state information for each CPR (table in FIG. 2B) from a load measurement device 13, via an access unit 14, and performs a load determination as in the first embodiment. The load measurement device 13 prepares load order information in a table shown in FIG. 4B, in which CPRs are ordered in the ascending order of their loads. The resumption count determination unit 15 collects resumption count information for each CPR (table in FIG. 3B) from a resumption count measurement unit 16, via an access unit 17, and performs a resumption count determination as in the second embodiment. The resumption count determination unit 15 then prepares resumption count order information in the table shown in FIG. 4B, in which CPRs are ordered in the ascending order of their resumption counts.

A control unit 11 in the processor interconnection monitoring device 10 employs the table in FIG. 4B to select a CPR for performing the MPR functions (the replacement processor). In FIG. 4B, since CPR#0 is ranked first according to both the load determination table and the resumption count table, the control unit 11 selects CPR#0 as the replacement processor. When the CPR occupying the first rank according to the load determination table differs from the one occupying that rank according to the resumption count table entries, the average rank value is obtained for each CPR, and the CPR having the smallest average is selected.

In the above described manner, the processor interconnection monitoring device 1 transmits an MPR closing notification signal T to CPR#0, and upon receiving this signal T, CPR#0 identifies itself as the replacement processor.

Figure 5:
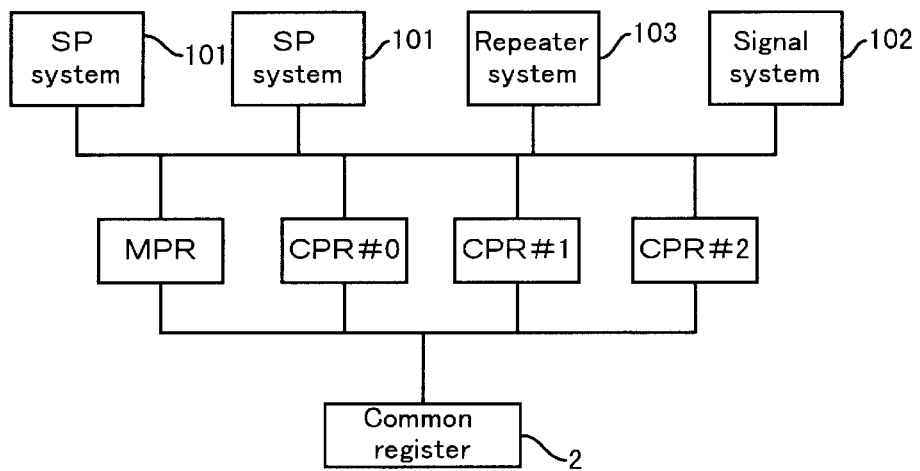
FIG. 5 is a block diagram illustrating a multi-processor switch according to another embodiment of the present invention.

FIG. 5 is a block diagram illustrating a multi-processor switch according to another embodiment of the present invention. The same reference numerals as used in FIG. 14 are also used to denote corresponding or identical components. In FIG. 5, however, instead of the processor interconnection monitoring device 1, a common register 2 is connected to a bus 200 which connects the MPR and the CPRs each other. As will be described later, the common register 2 is a memory for storing flags (closing flags) indicating the closed states of the MPR and CPRs.

Figure 6:
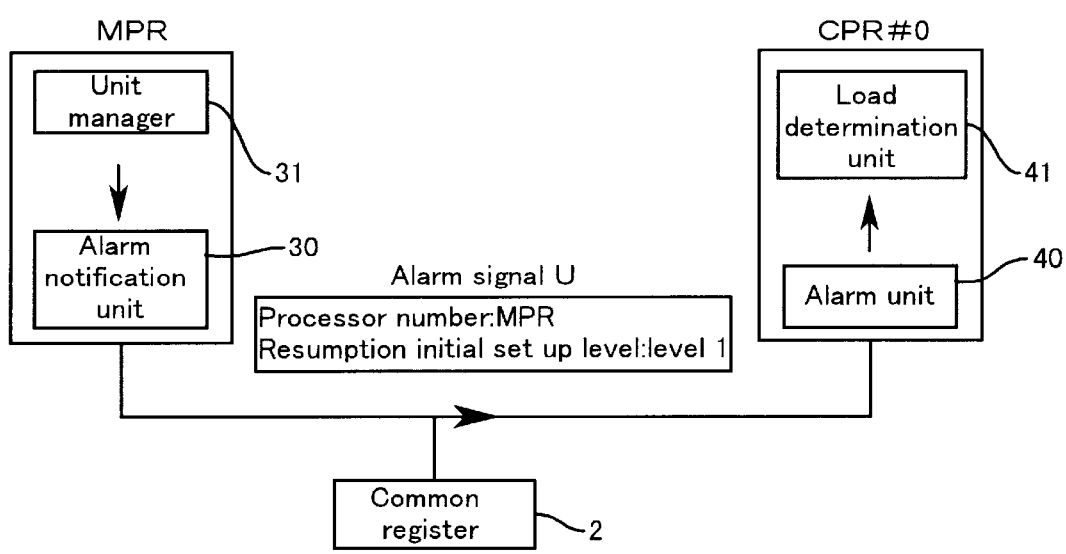
FIG. 6 is a diagram for explaining a signal to be exchanged by an MPR and CPRs when a failure occurs at the MPR according to the embodiment of the present invention.

FIG. 6 is a diagram for explaining a signal which is exchanged between an MPR and a CPR when a failure occurs at the MPR according to this embodiment of the present invention. In FIG. 6, when a failure occurs at the MPR in this embodiment, the MPR begins the resumption initial setup process, and in the MPR an alarm notification unit 30 is activated by a unit manager 31.

The alarm notification unit 30 transmits, to each CPR, an alarm signal U which includes its own processor number and a resumption initial setup level. Thereafter, each CPR uses an alarm unit 40 to analyze the received alarm signal U, and employs the processor number included in the alarm signal to identify the broken processor as the MPR. The processor number is a physical number provided for the MPR and the CPRs. There are, for example, three resumption initial setup levels (1, 2 and 3), and as the level increases, the process required for the resumption initial setup becomes more complicated.

The alarm unit 40 of each CPR transmits a load determination instruction to the load determination unit 14. Since the load determination need only be performed by one CPR, one of the CPRs is selected to perform this determination, as will be described later.

Figure 7:
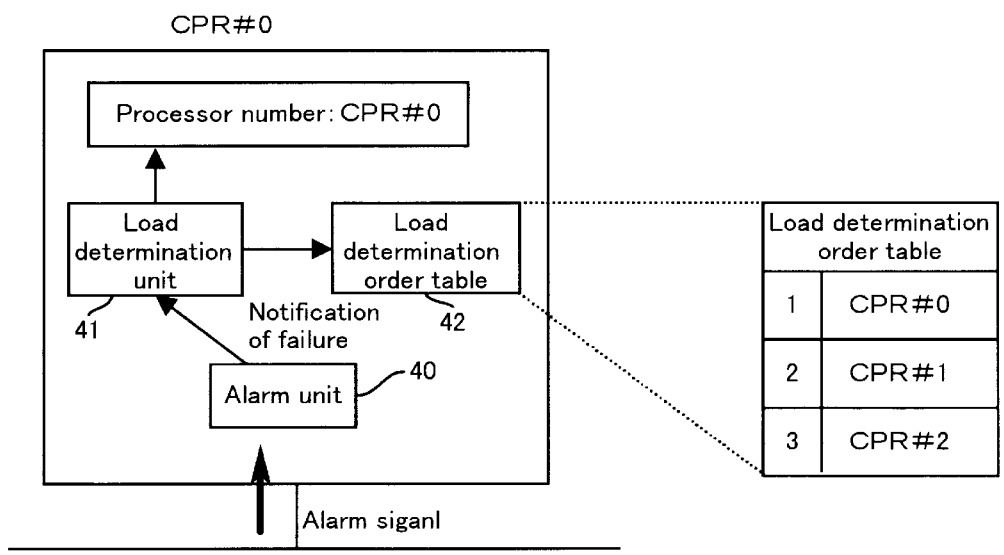
FIG. 7 is a diagram for explaining a process for determining the load for one CPR.

FIG. 7 is a diagram for explaining the process used to decide which CPR will perform the load determination. In FIG. 7, upon receiving a load determination instruction from the alarm unit 40, the load determination unit 41 examines the load determination order table 42 stored in its own memory to determine whether it is a processor for performing a load determination. When the processor number of the pertinent load determination unit 41 is ranked first in the load determination order table 42, the load determination unit 41 begins the load determination process. When the processor number is ranked second or lower, the load determination unit 41 reads, from the common register 2, closing flags for higher processor numbers, and examines the closed state of the higher CPRs. When all the CPRs at higher ranks are closed (the closing flags are in the ON state), the pertinent load determination unit 41 performs the load determination process. When a CPR at a higher rank is in the operating state (the closing flag is in the OFF state), the pertinent load determination unit 41 does not perform the load determination.

Assume that in the load determination order table 42 in FIG. 7 CPR#0 occupies the highest rank and CPR#1 is in the operating state. In this case, the load determination unit 41 for CPR#0 ascertains that it is to perform the load determination process.

Figure 8:
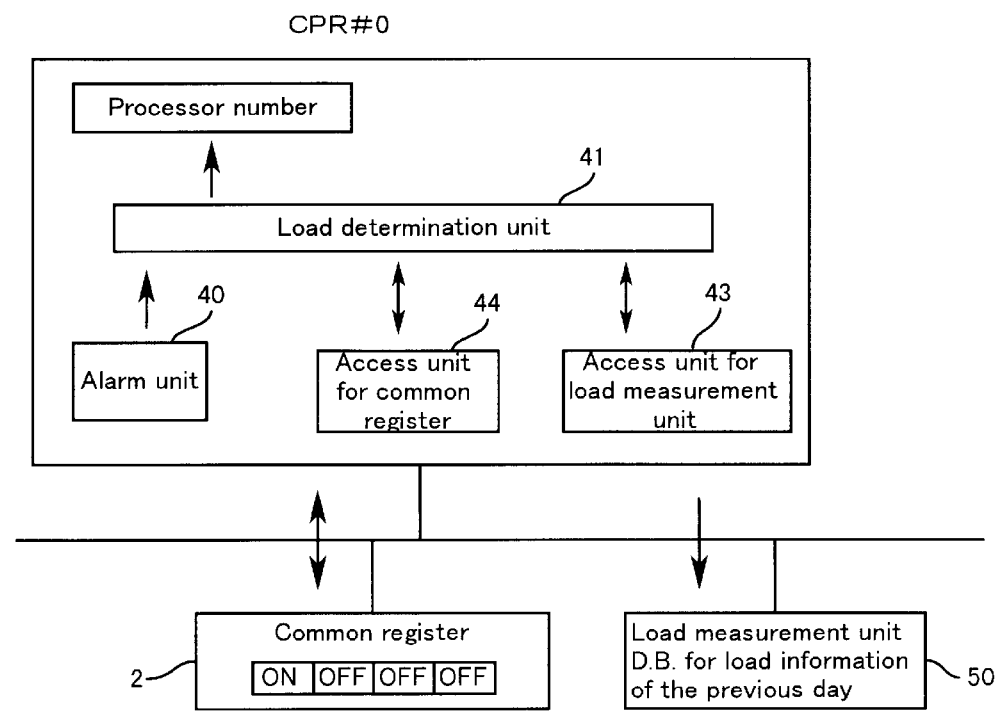
FIG. 8 is a diagram for explaining a load determination process.

FIG. 8 is a diagram for explaining the load determination process. In FIG. 8, the load determination unit 41 for CPR#0 accesses a load measurement unit 50 via an access unit 43. The load measurement unit 50 has the same functions as the load measurement unit 13 in the first embodiment. That is, the load measurement unit 50 acquires the load for each CPR, and stores them as load state information (table in FIG. 2B) in the database of the load measurement unit 50. Therefore, the load determination unit 41 reads the table in FIG. 2B from the load measurement unit 50, and performs the load determination as in the first embodiment. As a result, the load determination unit 41 selects CPR#0 as the CPR which is to serve as the MPR (the replacement processor).

When a failure occurs at the MPR, the MPR automatically performs the resumption initial setup process. The MPR in this embodiment, as well as in the above described embodiment, includes a processor closing unit 21. The processor closing unit 21 counts the number of times the MPR performs the resumption initial setup process. When the operation is not resumed even though the number of times the process has been performed has reached a predetermined count, the processor closing unit 21 permits the MPR to terminate the resumption initial setup process, and closes it. The processor closing unit 21 transmits a closing signal to the common register 2, and sets to the ON state the closing flag which corresponds to the processor number of the MPR.

While performing the above described load determination process, the load determination unit 41 of CPR#0 examines, via a common register access unit 44, the state of the closing flag of the MPR for each specific period of time. Stored in the common register 2 is a closing flag for each processor number. In FIG. 8 are shown, in order, starting from the left, the states of the closing flags for the MPR, CPR#0, CPR#1 and CPR#2.

When the load determination unit 41 detects that the closing flag of the MPR has been set and is ON state, it determines that CPR#0 is to be the replacement processor. CPR#0 then identifies itself as the replacement processor, and begins to function as the MPR. CPR#0 also writes its processor number in the replacement processor number setup area (not shown) of the common register 2.

In the above example the CPR (CPR#0) which performed the load determination and the CPR (CPR#0) which was selected correspond. When the two CPRs do not correspond, the load determination unit 41 of CPR#0 transmits a decision signal (not shown) to the other CPR (e.g., CPR#1), which is selected to function as the MPR. Upon receiving the decision signal, CPR#1 identifies itself as the replacement processor, and begins to perform the functions of the MPR.

Also, when selecting a CPR to function as the MPR in this embodiment of the present invention, instead of the load state information, the resumption count information in the second embodiment may be employed, or both the load state information and the resumption count information in the third embodiment may be employed.

An explanation will now be given for the process for switching the main processor from the MPR to CPR#0, and for operating CPR#0 as the replacement processor of the MPR.

Figure 9:
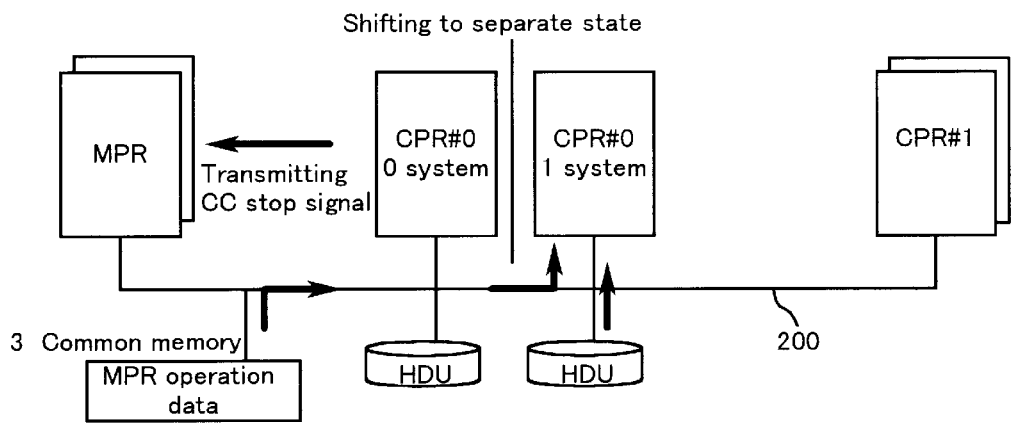
FIG. 9 is a diagram for explaining a main processor switching process for switching from an MPR to CPR#0.

FIG. 9 is a diagram for explaining the process used when switching the main processor functions from the MPR to CPR#0. In FIG. 9, when CPR#0 identifies itself as the replacement processor of the MPR, it transmits to the MPR a CC stop signal to stop the MPR. After the MPR is stopped, CPR#0 is shifted from the double operating state, for systems 0 and 1, to the separate operating state, wherein systems 0 and 1 are separated. In the normal operating state, a processor performs the same processing for systems 0 and 1, while the systems are synchronized with each other (double operation). In this embodiment, these two systems are separated, and one of the systems (e.g., system 0) performs a calling process as CPR#0, while the other system (e.g., system 1) performs the MPR functions.

Thus, since in the separate operating state system 1 of CPR#0, for example, performs the functions of the main processor, system 1 loads MPR operation data from the common memory 3 and a system file from its own storage device (a so-called hard disk unit (HDU)), and performs the initialization. After the initialization, system 1 of CPR#0 functions as the main processor, while system 0 of CPR#0 continues perform calling processes.

Figure 10:
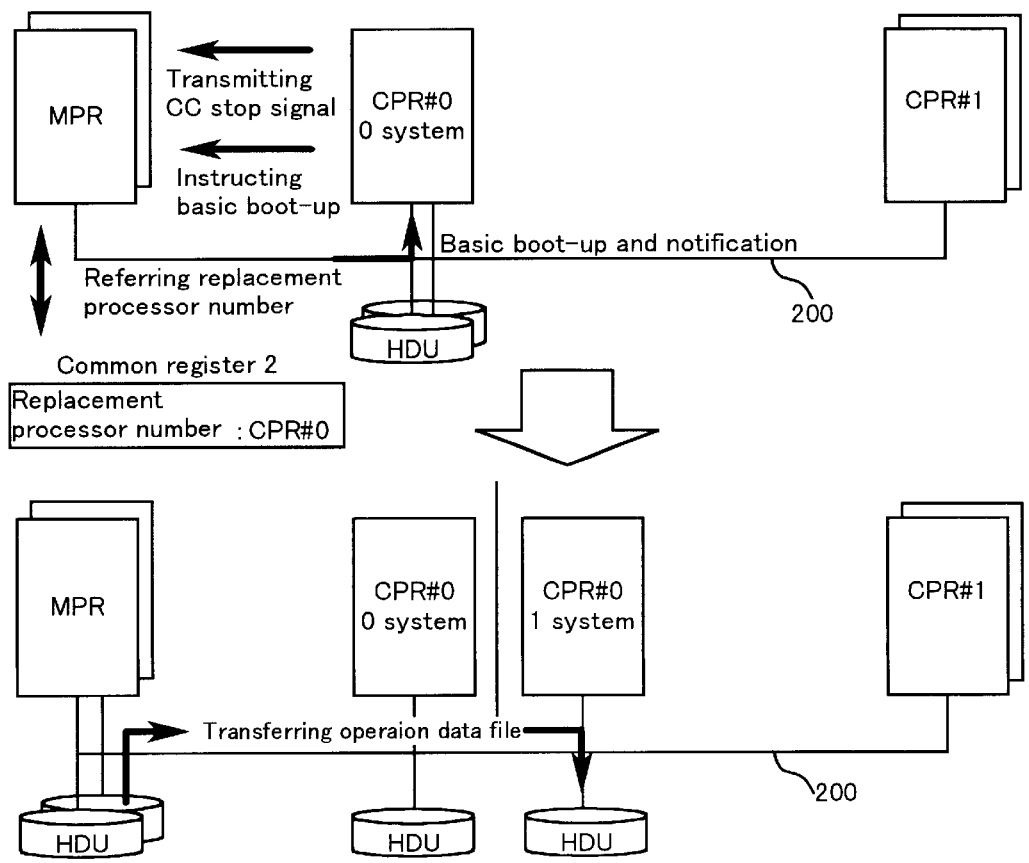
FIG. 10 is a diagram for explaining another main processor switching process for switching from an MPR to CPR#0.

FIG. 10 is a diagram for explaining another process for switching the main processor functions from the MPR to CPR#0. In FIG. 10, when CPR#0 identifies itself as the replacement processor of the MPR, it transmits to the MPR a CC halt signal to stop the MPR. After the MPR is stopped, CPR#0 transmits to the MPR an instruction for the minimum boot-up of only the CP/IO system (hereinafter referred to as basic boot-up). After the basic boot-up of the MPR has been completed, the MPR reads the processor number of the replacement processor (CPR#0), which is written in the common register 2, and transmits the basic boot-up end notification to the processor (CPR#0) corresponding to that processor number. Upon receiving the basic boot-up end notification, CPR#0 transfers the MPR operation data from the storage device (HDU) of the MPR to its own storage device (HDU). Then, CPR#0 is shifted form from the double operating state to the separate operating state, and one of the systems (e.g., system 0) performs calling processes, while the other system (e.g., system 1) begins to perform the functions of the MPR.

Figure 11:
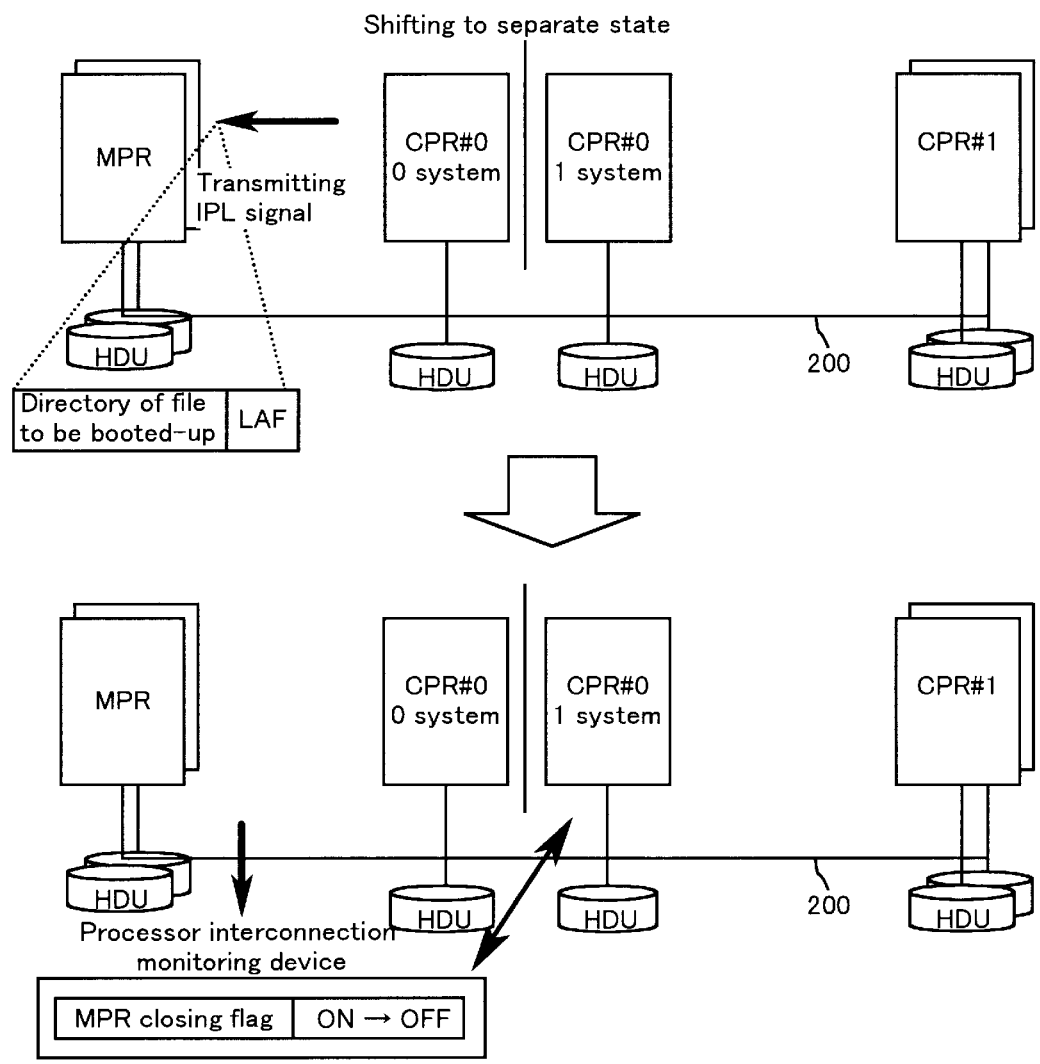
FIG. 11 is a diagram for explaining an MPR recovery process.

FIG. 11 is a diagram for explaining the process for recovering the MPR. AS is shown in FIG. 9 or 10, while performing in the separate operation state, recovery of the MPR is effected by CPR#0 in the following manner. In FIG. 11, CPR#0 transmits an IPL (Initialize Program Load) signal to the MPR. Upon receiving the IPL signal, in accordance with a directory included in the IPL signal in which a file to be booted-up is stored, the MPR loads that file from its own storage device (HDU) to the memory.

When the resumption initial setup is completed in accordance with the IPL signal, the MPR changes from ON state to OFF state its closing flag which is stored in the processor interconnection monitoring device 1.

After the transmission of the IPL signal, CPR#0 periodically refers to the closing flag which is stored in the processor interconnection monitoring device 1. When CPR#0 detects that the closing flag corresponding to the MPR has been set to OFF state, CPR#0 ascertains that recovery of the MPR has been accomplished.

Figure 12:
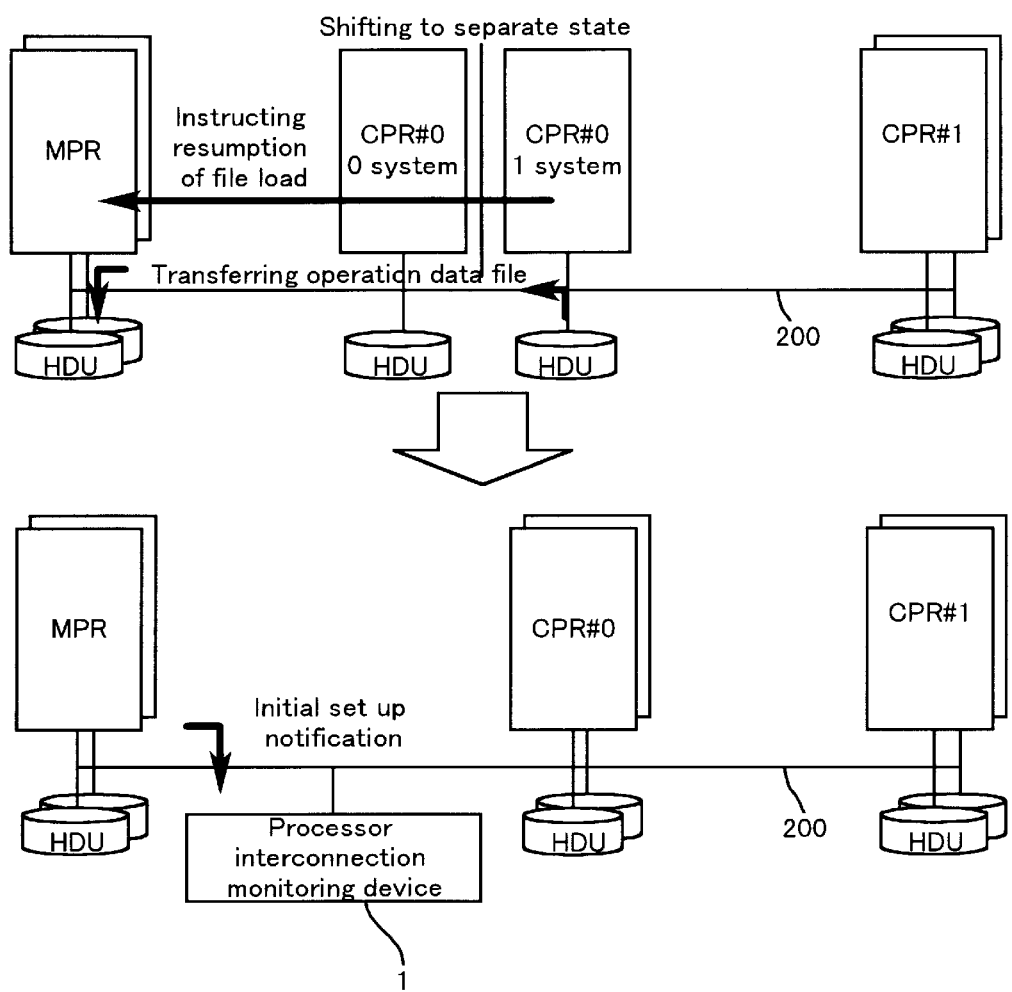
FIG. 12 is a diagram for explaining a process for returning the MPR and CPR#0 to their normal states after recovery of the MPR has been effected.

FIG. 12 is a diagram for explaining the process for returning the MPR and CPR#0 to their normal states after recovery of the MPR has been accomplished. In FIG. 12, when the resumption initial setup for the MPR has been completed, the operation data file stored in the storage device (HDU) of system 1 of CPR#0, which is functioning as the main processor, is copied to the storage device of the MPR. Then, a file load resumption instruction is transmitted from system 1 of CPR#0 to the MPR in order for the copied operation data file to be used. When the file has been loaded, CPR#0 releases the separate operation state, and is returned to the original double operating state as a co-processor. The MPR transmits an initial setup notification to the processor interconnection monitoring device 1, and initializes barrier information, etc. As a result, the MPR begins to function as the main processor.

Figure 13:
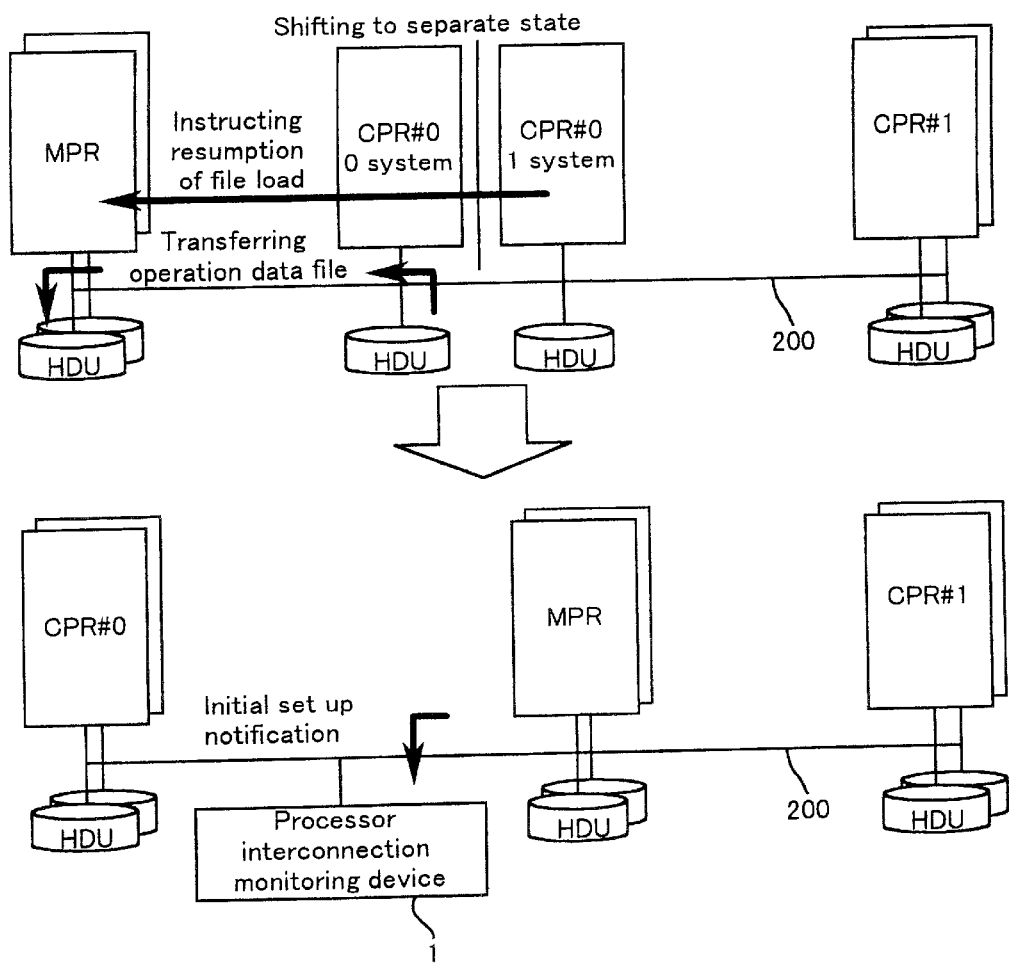
FIG. 13 is a diagram for explaining another process for returning the MPR and CPR#0 to their normal states.

FIG. 13 is a diagram for explaining another process for returning the MPR and CPR#0 to the normal states. In this process, even after recovery of the MPR has been accomplished, CPR#0 continues to be used as the main processor and the MPR performs the calling processes instead of CPR#0. In FIG. 13, since CPR#0, which is functioning as the main processor, continues to be employed as the main processor after the resumption initial setup for the MPR has been completed, the operation data file for the calling process is copied from the storage device (HDU) of system 0 of CPR#0, to the storage device (HDU) of the MPR. Then, a file load instruction is transmitted from system 1 of CPR#1 to the MPR in order for the operation data file to be used. When the file has been loaded, CPR#0 releases the separate operation state and operates in the double operation state as the main processor. The MPR transmits the initial setup notification to the processor interconnection monitoring device 1, and initializes barrier information, etc. Finally, the MPR functions as a co-processor and performs calling processes.

As is described above, according to the present invention, in a multi-processor switch which has one main processor and a plurality of co-processors, when a failure occurs at the main processor, the operating states (the load states or the resumption counts) of the co-processors are examined and the most appropriate co-processor is selected to function as the main processor. Therefore, a system shutdown does not occur and more stable main processor switching can be implemented.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. A multi-processor switch comprising:
a main processor;
a plurality of co-processors for performing a calling process under the control of the main processor;
a detection unit for detecting a failure at the main processor;
a determination unit for determining a replacement processor for performing the main processor functions from among the co-processors based on the operating state of each co-processor when the failure at the main processor is detected by the detection unit; and
a switching unit for switching the co-processor determined by the determination unit as the replacement processor to a new main processor,
wherein the operating state of each co-processor is resumption occurrence count of each co-processor.

2. A multi-processor switch comprising:
a main processor;
a plurality of co-processors for performing a calling process under the control of the main processor;
a detection unit for detecting a failure at the main processor;
a determination unit for determining a replacement processor for performing the main processor functions from among the co-processors based on the operating state of each co-processor when the failure at the main processor is detected by the detection unit; and
a switching unit for switching the co-processor determined by the determination unit as the replacement processor to a new main processor,
wherein the operating state of each co-processor is load state and resumption occurrence count for each co-processor.

3. A multi-processor switch comprising:
a main processor;
a plurality of co-processors for performing a calling process under the control of the main processor;
a detection unit for detecting a failure at the main processor;
a determination unit for determining a replacement processor for performing the main processor functions from among the co-processors based on the operating state of each co-processor when the failure at the main processor is detected by the detection unit; and
a switching unit for switching the co-processor determined by the determination unit as the replacement processor to a new main processor,
wherein the new main processor performs both co-processor functions and main processor functions by shifting from a double operating state for the co-processor functions to a separate operating state,
wherein the new main processor obtains data concerning the main processor functions from a storage device at the main processor by basic boot-up of the main processor to perform the main processor functions, and
wherein, when the main processor has recovered from a failure, the new main processor transfers the data concerning the co-processor function to the main processor;
the main processor begins to perform the co-processor functions in accordance with the transferred data; and
the new main processor returns from the separate operating state to the double operating state to perform the main processor functions.

4. A multi-processor switch comprising:
a main processor;
a plurality of co-processors for performing a calling process under the control of the main processor;
a detection unit for detecting a failure at the main processor;
a determination unit for determining a replacement processor for performing the main processor functions from among the co-processors based on the operating state of each co-processor when the failure at the main processor is detected by the detection unit;
a switching unit for switching the co-processor determined by the determination unit as the replacement processor to a new main processor, and
a memory for storing data concerning the main processor functions, wherein the new main processor obtains the data concerning the main processor functions from the memory to perform the main processor functions, wherein the new main processor performs both co-processor functions and main processor functions by shifting from a double operating state for the co-processor functions to a separate operating state, and wherein, when the main processor has recovered from a failure, the new main processor transfers the data concerning the co-processor function to the main processor;

the main processor begins to perform the co-processor functions in accordance with the transferred data; and the new main processor returns from the separate operating state to the double operating state to perform the main processor functions.

5. A main processor switching method for a multi-processor switch including a main processor and a plurality of co-processors for performing calling processes under the control of the main processor, comprising:

detecting a failure at a main processor;

determining a replacement processor for performing the main processor functions from among the co-processors based on the operating state of the co-processors;

switching the co-processor determined as the replacement processor to a new main processor; and performing the main processor functions by the new main processor, wherein the new main processor performs both co-processor functions and main processor functions by shifting from a double operating state for the co-processor functions to a separate operating state, wherein the new main processor obtains the data concerning the main processor functions to perform the main processor functions, and wherein, when the main processor has recovered from a failure, the new main processor transfers the data concerning the co-processor function to the main processor;

the main processor begins to perform the co-processor functions in accordance with the transferred data; and the new main processor returns from the separate operating state to the double operating state to perform the main processor functions.

6. A multi-processor switch comprising:

a main processor;

a plurality of co-processors for performing a calling process under the control of the main processor, wherein the operating state of each co-processor is resumption occurrence count of each co-processor;

a detection unit for detecting a failure at the main processor; and a determination unit for determining a replacement processor for performing the main processor functions from among the co-processors based on the operating state of each co-processor when the failure at the main processor is detected by the detection unit.

7. A multi-processor switch comprising:

a main processor;

a plurality of co-processors for performing a calling process under the control of the main processor, wherein the operating state of each co-processor is load state and resumption occurrence count for each co-processor;

a detection unit for detecting a failure at the main processor; and a determination unit for determining a replacement processor for performing the main processor functions from among the co-processors based on the operating state of each co-processor when the failure at the main processor is detected by the detection unit.

8. A multi-processor switch comprising:

a main processor;

a plurality of co-processors for performing a calling process under the control of the main processor;

a detection unit for detecting a failure at the main processor; and a determination unit for determining a replacement processor for performing the main processor functions from among the co-processors based on the operating state of each co-processor when the failure at the main processor is detected by the detection unit, wherein the replacement processor performs both co-processor functions and main processor functions by shifting from a double operating state for the co-processor functions to a separate operating state, wherein the replacement processor obtains data concerning the main processor functions from a storage device at the main processor by basic boot-up of the main processor to perform the main processor functions, and wherein, when the main processor has recovered from a failure, the replacement processor transfers the data concerning the co-processor function to the main processor;

the main processor begins to perform the co-processor functions in accordance with the transferred data; and the replacement processor returns from the separate operating state to the double operating state to perform the main processor functions.

9. A multi-processor switch comprising:

a main processor;

a plurality of co-processors for performing a calling process under the control of the main processor;

a detection unit for detecting a failure at the main processor;

a determination unit for determining a replacement processor for performing the main processor functions from among the co-processors based on the operating state of each co-processor when the failure at the main processor is detected by the detection unit, wherein the replacement processor performs both co-processor functions and main processor functions by shifting from a double operating state for the co-processor functions to a separate operating state, and wherein, when the main processor has recovered from a failure, the replacement processor transfers the data concerning the co-processor function to the main processor;

the main processor begins to perform the co-processor functions in accordance with the transferred data; and the replacement processor returns from the separate operating state to the double operating state to perform the main processor functions; and a memory for storing data concerning the main processor functions, wherein the replacement processor obtains the data concerning the main processor functions from the memory to perform the main processor functions.

10. A main processor switching method for a multiprocessor switch including a main processor and a plurality of co-processors for performing calling processes under the control of the main processor, comprising:

detecting a failure at a main processor;

determining a replacement processor for performing the main processor functions from among the co-processors based on the operating state of the co-processors; and performing the main processor functions by the replacement processor, wherein the replacement processor performs both co-processor functions and main processor functions by shifting from a double operating state for the co-processor functions to a separate operating state, wherein the replacement processor obtains the data concerning the main processor functions to perform the main processor functions, and wherein, when the main processor has recovered from a failure, the replacement processor transfers the data concerning the co-processor function to the main processor;

the main processor begins to perform the co-processor functions in accordance with the transferred data; and the replacement processor returns from the separate operating state to the double operating state to perform the main processor functions.

* * * * *